(12) United States Patent
Li et al.

(10) Patent No.: US 7,431,148 B2
(45) Date of Patent: Oct. 7, 2008

(54) UNIVERSAL TRANSMISSION ROLLER WHEEL

(75) Inventors: Guangtai Li, Shandong (CN); Shaoyin Hao, Shandong (CN); Yan Meng, Shandong (CN)

(73) Assignee: Weihai Guangtai Airport Equipment Co., Ltd., Shandong (CN)

( * ) Notice: Subject to any disclaimer, the term of this patent is extended or adjusted under 35 U.S.C. 154(b) by 0 days.

(21) Appl. No.: 11/818,825

(22) Filed: Jun. 15, 2007

(65) Prior Publication Data

US 2008/0000749 A1    Jan. 3, 2008

Related U.S. Application Data

(63) Continuation of application No. PCT/CN2005/000277, filed on Mar. 7, 2005.

(30) Foreign Application Priority Data

Dec. 28, 2004   (CN) ..................... 2004 1 0075778

(51) Int. Cl.
    *B65G 13/00*   (2006.01)
(52) U.S. Cl. ............................... 198/786; 193/35 MD
(58) Field of Classification Search ............ 193/35 MD; 198/786
    See application file for complete search history.

(56) References Cited

U.S. PATENT DOCUMENTS

| 5,064,045 | A  | * | 11/1991 | Leon ..................... 193/35 MD |
| 5,404,984 | A  | * | 4/1995  | Hagman ................. 193/35 MD |
| 6,244,417 | B1 |   | 6/2001  | Timmer et al. |
| 6,340,083 | B1 | * | 1/2002  | Zhou et al. ............. 198/370.09 |
| 6,409,010 | B1 | * | 6/2002  | Leon .......................... 198/786 |
| 6,981,580 | B2 | * | 1/2006  | Meyer ........................ 198/415 |

FOREIGN PATENT DOCUMENTS

CN     A1212213     3/1999

OTHER PUBLICATIONS

International Search Report. PCT/CN2005/000277.

* cited by examiner

*Primary Examiner*—Mark A Deuble
(74) *Attorney, Agent, or Firm*—Kathleen Williams; Edwards Angell Palmer & Dodge LLP

(57) ABSTRACT

A universal transmission roller wheel comprises a 90° roller support and a 45° roller support. There is a drive axle hole in the center of each support. The 90° roller support and the 45° roller support are integrated in parallel. 90° rollers are mounted on first supporting shafts fixed around on the 90° roller support with regular intervals, the axis of each 90° roller is at a spatial angle of 90° with the axis of the drive axle bore, 45° rollers are mounted on second supporting shafts fixed around on the 45° roller support with regular intervals, the axis of each 45° roller is at a spatial angle of 45° with the axis of the drive axle bore in the same inclining orientation.

10 Claims, 6 Drawing Sheets

US 7,431,148 B2

UNIVERSAL TRANSMISSION ROLLER WHEEL

RELATED APPLICATIONS

This is a continuation patent application which claims priority to PCT/CN2005/000277 filed on Mar. 7, 2005, which claims the benefit of CHINA CN2004/10075778.5 filed Dec. 28, 2004.

FIELD OF THE INVENTION

This present invention relates to a device for transferring cargoes, in particular to a universal transmission roller wheel for loading and unloading of container and pallet.

BACKGROUND OF THE INVENTION

It's well-known that the transmission roller wheel mounted on container/pallet loader platform can be made into several models according to the roller structure and position relationship between the roller and drive axle: straight roller wheel, 45° pineapple type roller wheel and 90° trefoil type roller wheel. The straight roller wheel characterizes the same direction with the drive axle, and the roller contacts with the cargo supporting plate in line. The advantages for using this straight roller wheel are: simple structure, stronger force transferred, less abrasion and convenience for maintenance, while the disadvantage is that the cargoes with single degree of freedom can only be transferred longitudinally and are incapable of transferring rotationally and transversely. So it is only applicable for small lift transfer platform device. For 45° pineapple type roller wheel, rollers are divided into districts and mounted on the wheel symmetrically. The advantages for using this 45° pineapple type roller wheel are: as the roller axis makes an angle of 45° with the drive axle and the direction of resultant force (magnitude and direction) is identical with direction of cargoes rotation, cargoes may be transferred in longitudinal, transverse and rotative directions, while the disadvantages are: efficiency is reduced because the component force is 0.7 time of the resulting force during longitudinal and transverse transferring; the roller contacts with cargoes on single point, which results in more abrasion; and it is necessary to add rollers for transferring stronger force. The 90° trefoil type roller wheel can only transfer cargoes along single direction forward and backward, therefore, to realize longitudinal, transverse moving and rotation, roller wheel axles must be intercrossed in longitudinal and transverse directions. The advantages for using this 90° trefoil type roller wheel are: longitudinal and transverse moving can be controlled respectively and conveniently, while the disadvantages are: too many roller wheel axles, intercross of axles, complicated structure, difficult to arrange transferring, poor processing property, single point contact resulting in more abrasion, and axial projection of rollers outline is hardly to be continuous.

SUMMARY OF THE INVENTION

The present invention provides a universal transmission roller wheel for container/pallet loader, which characterizes advantages of straight roller wheel, 45° roller wheel and 90° roller wheel. The outline of the universal transmission roller wheel is similar to the straight roller wheel, i.e. more than two supporting and transferring points on periphery of the roller wheel. The resultant force direction of 45° rollers arranged on the universal transmission roller wheel is identical with cargo rotation direction, and it's convenient to rotate cargoes and rectify a deviation. Owing to 90° side rollers mounted on the universal transmission roller wheel, more than one supporting and transferring points have been added to the wheel, and transmission moment has been increased more than one time. With the same quantity of roller wheels, heavier cargoes can be transferred; on the other hand, the quantity of wheels and wheel groups can be reduced when transferring cargoes with the same weight. The roller wheel axle arrangement keeps the advantages of 45° roller wheel axle. Therefore the loader platform device is in a simplified structure and smooth transmission, continuous working and high efficiency.

The present invention provides a universal roller wheel comprising a 90° roller support, a 45° roller support, a drive axle hole being provided in the center of each roller support, wherein the 90° roller support and the 45° roller support are integrated in parallel. 90° rollers are mounted on first supporting shafts fixed around on the 90° roller support with regular intervals. The axis of each 90° roller is at a spatial angle of 90° with the axis of the drive axle bore. Similarly, 45° rollers are mounted on second supporting shafts fixed around on the 45° roller support with regular intervals. The axis of each 45° roller is at a spatial angle of 45° with the axis of the drive axle bore in the same inclining orientation. The respective highest points on the outside surfaces of corresponding 90° rollers and 45° rollers are in a plane. The present invention also provides a universal roller wheel comprising a 45° roller support, two 90° roller supports arranged on either side of the 45° roller support, wherein the 45° roller support and the two 90° roller supports are integrated. There may be six 90° rollers on each of the two 90° roller supports and six 45° rollers on the 45° roller support; or four 90° rollers on the 90° roller support and six 45° rollers on the 45° roller support. Or there may be four 90° rollers on the 90° roller support and six 45° rollers on the 45° roller support; or four 90° rollers on each of the two 90° roller supports and six 45° rollers on the 45° roller support. According to the present invention, the outline diameter of the 90° roller support is equal to the outline diameter of the 45° roller support. The 90° roller support where the 90° rollers mounted is parallel with the 45° roller support where the 45° rollers mounted. According to a preferred embodiment of the present invention, the 90° roller support is arranged on the left of the 45° roller support and the 45° roller shall be sinistral. According to another preferred embodiment of the present invention, the 90° roller support 6 is arranged on the right of the 45° roller support and the 45° roller shall be dextral.

BRIEF DESCRIPTION OF THE DRAWINGS

For a more detailed description of the present invention, reference will now be made to the accompanying figures, wherein.

Figure 1:
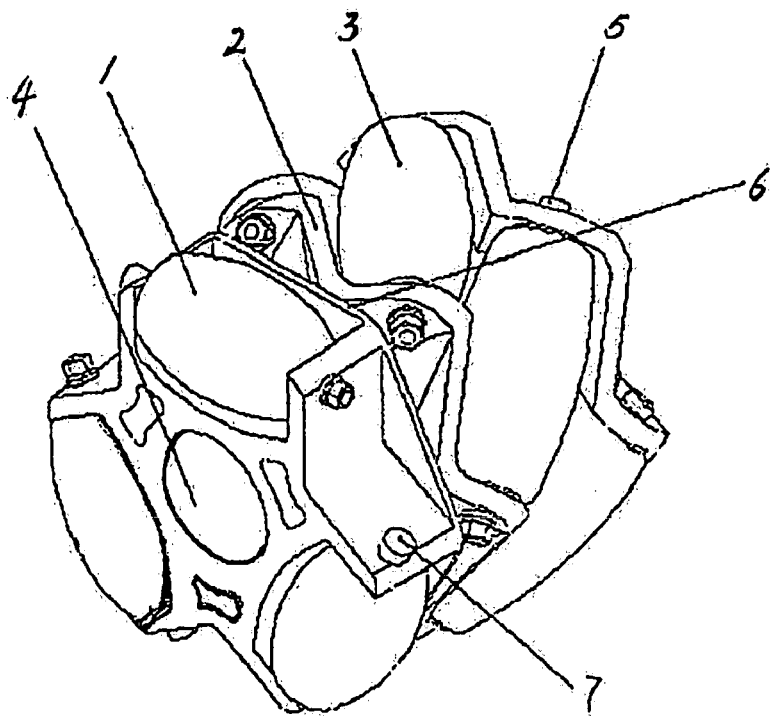
FIG. 1 shows schematic view of the structure according to the first embodiment of the present invention.

EXPLANATION OF THE NUMBERS IN ALL DRAWINGS 1. 90° roller
2. 45° roller support
3. 45° roller
4. Drive axle bore
5. Second supporting shaft
6. 90° roller support
7. First supporting shaft
8. Cargo supporting plate

DETAILED DESCRIPTION OF PREFERRED EMBODIMENTS

Preferred embodiments of the present invention are as follows.

1. Referring initially to FIG. 1, the universal transmission roller wheel comprises a 90° roller support 6 and a 45° roller support 2, which are integrated in parallel. There is a drive axle bore 4 provided in the center of each roller support. Three 90° rollers 1 are mounted on first supporting shafts 7 fixed around on the roller support 6 with regular intervals. The axis of each of the 90° roller 1 is at a spatial angle of 90° with the axis of the drive axle bore 4. Similarly, six 45° rollers 3 are mounted on second supporting shafts 5 fixed around on the 45° roller support 2 with regular intervals. The axis of each of the 45° rollers 1 is at a spatial angle of 45° with the axis of the drive axle bore 4 in the same inclining orientation. Both the 90° roller support 6 and the 45° roller support 2 rotate round the drive axle and have equal outline diameter. The 90° rollers 1 rotate round the first supporting shaft 7, while the 45° rollers 3 rotate round the second supporting shaft 5. The respective highest points on the outside surfaces of corresponding 90° roller 1 and 45° roller 3 are in a plane.

Figure 2:
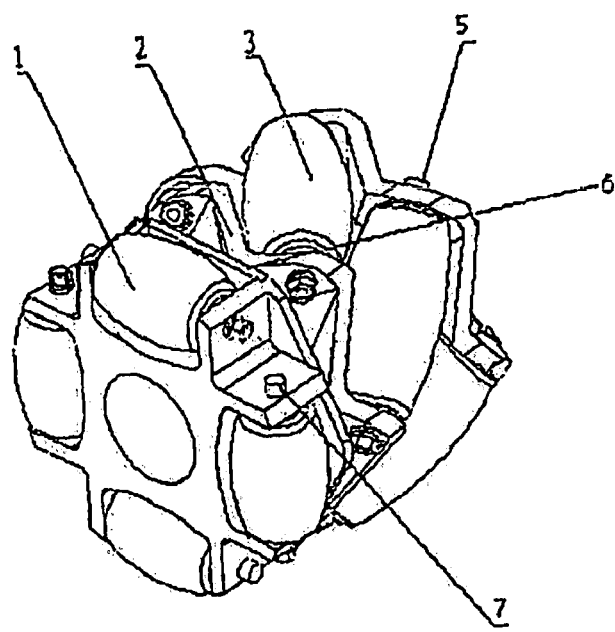
FIG. 2 shows schematic view of the structure according to the second embodiment of the present invention.

2. Referring now to FIG. 2, the universal transmission roller wheel comprises a 90° roller support 6 and a 45° roller support 2, which are integrated in parallel. There is a drive axle bore 4 provided in the center of each roller support. Four 90° rollers 1 are mounted on first supporting shafts 7 fixed around on the roller support 6 with regular intervals. The axis of each of the 90° roller 1 is at a spatial angle of 90° with the axis of the drive axle bore 4. Similarly, six 45° rollers 3 are mounted on second supporting shafts 5 fixed around on the 45° roller support 2 with regular intervals. The axis of each of the 45° rollers 1 is at a spatial angle of 45° with the axis of the drive axle bore 4 in the same inclining orientation. Both the 90° roller support 6 and the 45° roller support 2 rotate round the drive axle and have equal outline diameter. The 90° rollers 1 rotate round the first supporting shaft 7, while the 45° rollers 3 rotate round the second supporting shaft 5. The respective highest points on the outside surfaces of corresponding 90° roller 1 and 45° roller 3 are in a plane.

Figure 3:
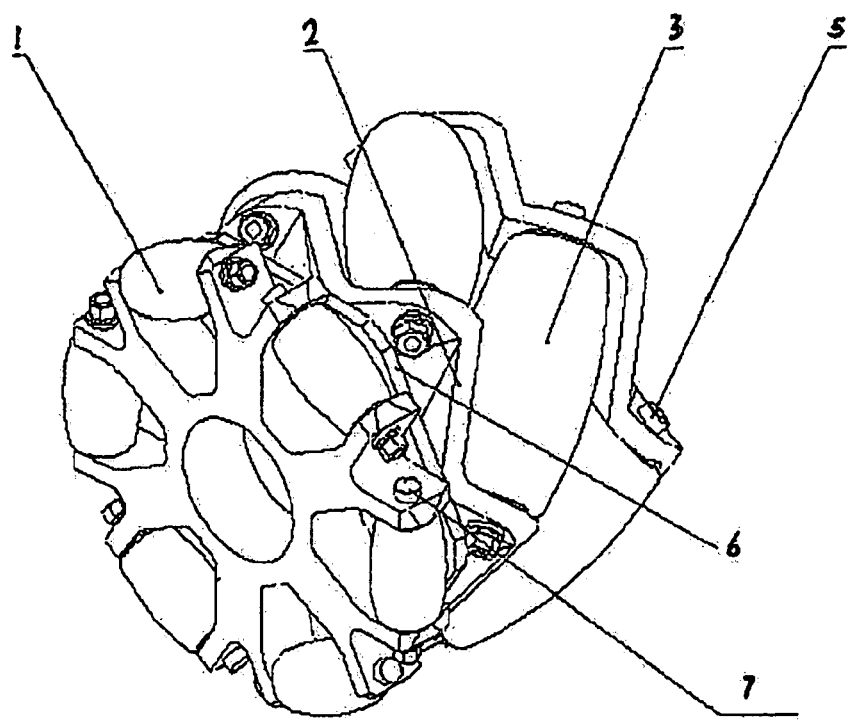
FIG. 3 shows schematic view of the structure according to the third embodiment of the present invention.

3. Referring now to FIG. 3, the universal transmission roller wheel comprises a 90° roller support 6 and a 45° roller support 2, which are integrated in parallel. There is a drive axle bore 4 provided in the center of each roller support. Six 90° rollers 1 are mounted on first supporting shafts 7 fixed around on the roller support 6 with regular intervals. The axis of each of the 90° roller 1 is at a spatial angle of 90° with the axis of the drive axle bore 4. Similarly, six 45° rollers 3 are mounted on second supporting shafts 5 fixed around on the 45° roller support 2 with regular intervals. The axis of each of the 45° rollers 1 is at a spatial angle of 45° with the axis of the drive axle bore 4 in the same inclining orientation. Both the 90° roller support 6 and the 45° roller support 2 rotate round the drive axle and have equal outline diameter. The 90° rollers 1 rotate round the first supporting shaft 7, while the 45° rollers 3 rotate round the second supporting shaft 5. The respective highest points on the outside surfaces of corresponding 90° roller 1 and 45° roller 3 are in a plane.

Figure 4:
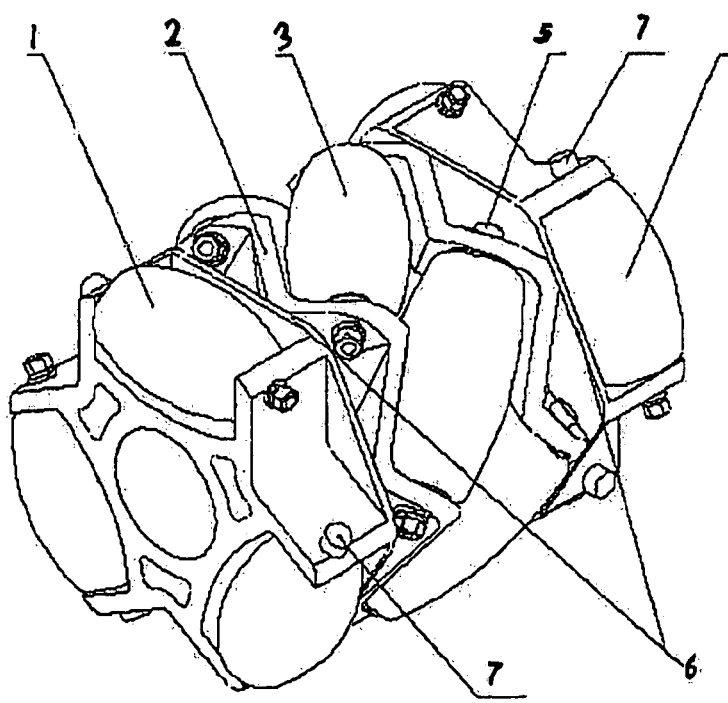
FIG. 4 shows schematic view of the structure according to the fourth embodiment of the present invention.

4. Referring to FIG. 4, the universal transmission roller wheel comprises two 90° roller supports 6 and a 45° roller support 2 fixed therebetween. The three roller supports are integrated in parallel. There is a drive axle bore 4 provided in the center of each roller support. Three 90° rollers 1 are mounted on first supporting shafts 7 fixed around on the roller support 6 with regular intervals. The numbers of rollers mounted on the two 90° roller supports are equal. The axis of the 90° roller 1 is at a spatial angle of 90° with the axis of the drive axle bore 4. Similarly, six 45° rollers 3 are mounted on second supporting shafts 5 fixed around on the 45° roller support 2 with regular intervals. The axis of each 45° roller 3 is at a spatial angle of 45° with the axis of the drive axle bore 4 in the same inclining orientation. Both 90° roller supports 6 and 45° roller support 2 rotate round the drive axle, and have equal outline diameter. The 90° rollers 1 rotate round the first supporting shafts 7, while the 45° rollers 3 rotate round the second supporting shafts 5. The respective highest points on the outside surfaces of the 90° roller 1 and the 45° roller 3 are in a plane. In this embodiment, three rollers simultaneously contact with the cargoes at three points, so that when the drive axle drives the roller wheel to rotate, the movement track of the roller wheel forms a cylindrical surface whose axis is the axis of the drive axle. The 90° rollers 1 on both sides are relatively fixed to the 90° roller support shafts 7, the supporting plate 8 is driven longitudinally by friction between them. The 45° roller 3 rotates round the second supporting shaft 5 while it revolves round the drive axle. The supporting plate 8 is driven longitudinally by component force of the 45° rollers 3. The three rollers perform together to form resultant force.

In use, the universal transmission roller wheel according to the present invention shall be mounted on a drive axle. When the drive axle rotates, the 45° rollers 3 and the 90° rollers 1 revolve round the drive axle along with the roller support, and the respective highest points on the surfaces of one of the 45° rollers 3 and one of the 90° rollers 1 contact with the cargoes and drive the cargoes to move. When the cargoes are loaded on the supporting plate 8, bottom surface of the supporting plate 8 contacts with the 45° roller 3 and the 90° roller 1. As the 45° rollers 3 and the 90° rollers 1 rotate along with the drive axle, the movement track of the 45° roller 3 and the 90° roller 1 forms a cylindrical surface whose axis is the axis of the drive axle. On one hand, because the 90° roller 1 is relatively fixed to the first supporting shaft 7, the supporting plate 8 is driven longitudinally by friction. On the other hand, the 45° roller 3 rotates round the supporting shaft 5 while revolves round the drive axle. The supporting plate 8 is driven longitudinally by component force of the 45° rollers 3. As a result, all rollers perform together to produce resultant force.

The more the 45° rollers and 90° rollers are mounted on the roller support, the smaller the clearance between adjacent rollers and the evener the rollers are forced, so that better continuity can be achieved. However, this will cause more difficulty and higher manufacture cost. The embodiments in the present invention give attention to both manufacture cost and practical performance.

The axis of the 90° rollers 1 are at a spatial angle of 90° with the drive axle 4, and the axis of the 45° rollers 3 are at a spatial angle of 45° with the drive axle 4. Error of ±2° or so during manufacturing and assembling is allowable. Although transmission effect becomes worse with increased error, the roller wheel can still work.

Figure 5:
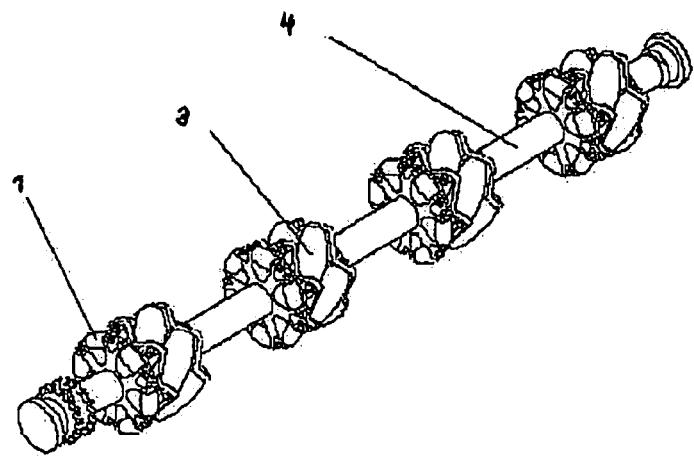
FIG. 5 shows schematic view of working state of the roller wheel mounted on the drive axle.

Referring to FIG. 5, several universal transmission roller wheels are fixed on the drive axle 4, the roller wheels are spaced from each other in radial direction for 30°~60°, which makes the transmission smooth and constant. The universal transmission roller wheels can be made into sinistral wheel and dextral wheel, and roller wheels in a drive axle are identical in spiral direction. The 90° roller support 6 is parallel with the 45° roller support 2 while the 90° roller support 6 is on the left side of the 45° roller support 2 and the 45° roller 3 is sinistral. The 90° roller support 6 is parallel with the 45° roller support 2 while the 90° roller support 6 is on the right side of the 45° roller support 2 and the 45° roller 3 is dextral. By this structure, resultant force is formed during transferring, so that transmission efficiency can be increased.

Figure 6:
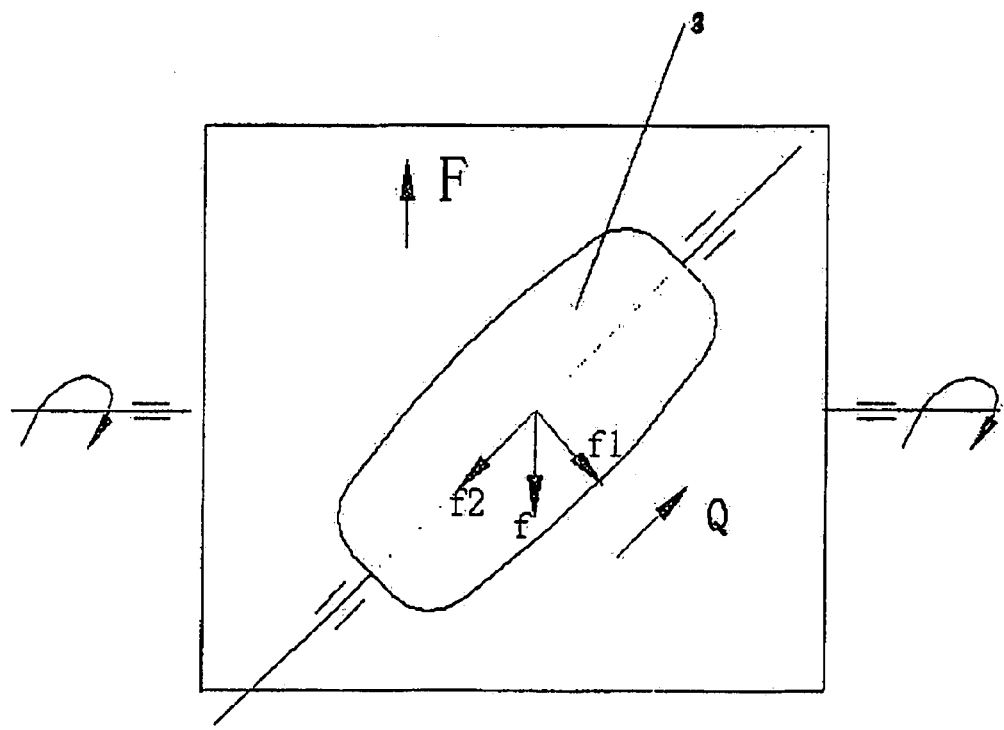
FIG. 6 shows schematic view of force applied to the 45° roller.
Figure 7:
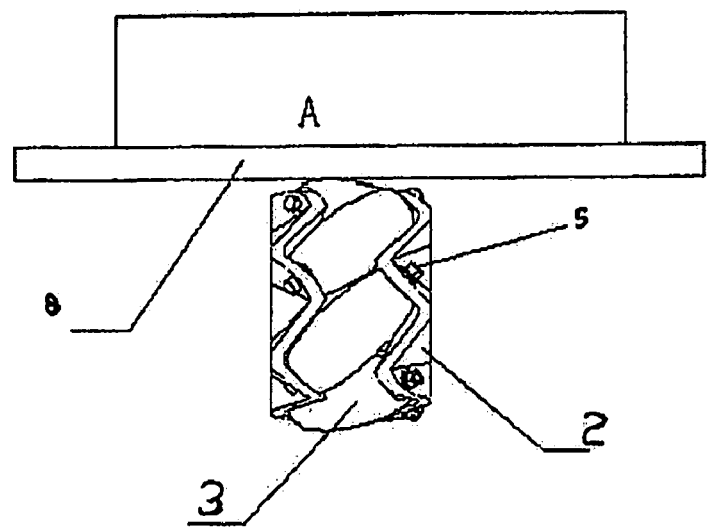
FIG. 7 shows schematic view of working state of the 45° universal transmission roller wheel.

Referring to FIG. 6 and FIG. 7, taking example for the 45° rollers 3, they contact with a supporting plate 8 by sequential turn. The contact point A moves along a curve track. The pressure intensity between the 45° rollers 3 and the supporting plate 8 is relatively high and the friction force is relatively large. The supporting plate 8 exerts gravity and friction resistance f to the contact point A of the 45° roller 3. The f can be divided into vectors f1 and f2. The force exerted to push the supporting plate 8 by the 45° roller 3 is −f2. The supporting plate 8 moves in direction Q. When the 45° roller 3 rotates reversely, the supporting 8 moves in an opposite direction. This principle is also applicable to dextral 45° roller wheel, except a symmetrical direction of the sinistral 45° roller wheel.

Figure 8:
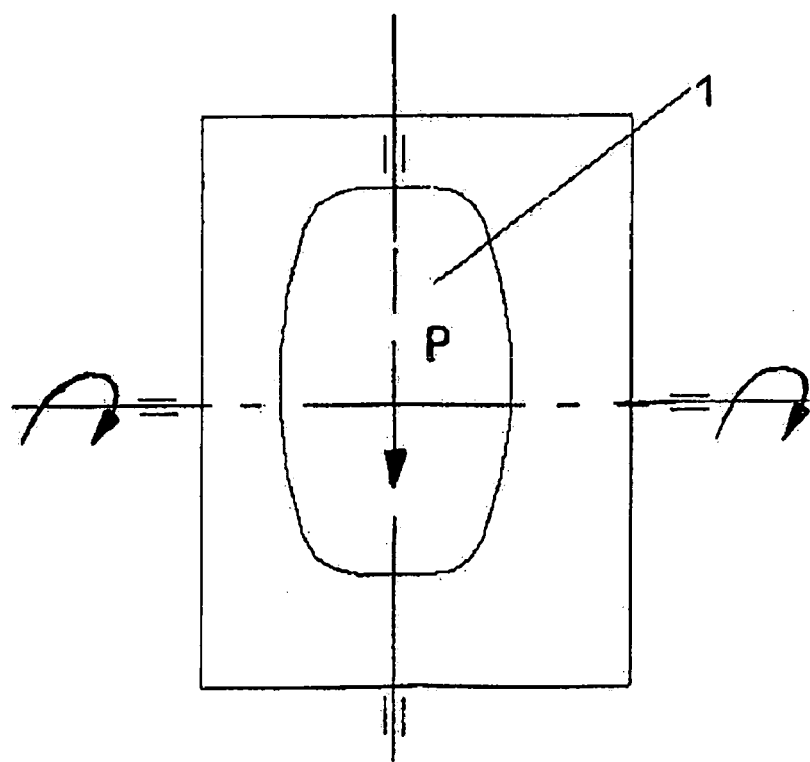
FIG. 8 shows schematic view of force applied to the 90° roller.
Figure 9:
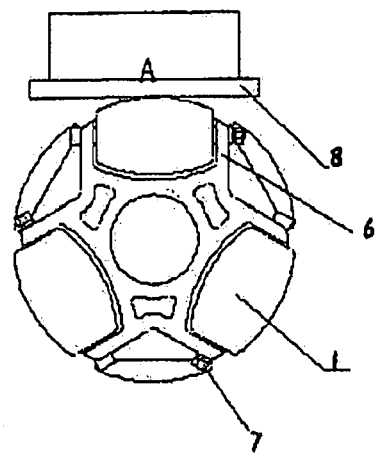
FIG. 9 shows schematic view of working state of the 90° universal transmission roller wheel.

Referring to FIG. 8 and FIG. 9, the 90° rollers 1 contact with the supporting plate 8 by sequential turn. The contact point A moves along a linear track. The pressure intensity between the 90° rollers 1 and the supporting plate 8 is relatively high and the friction force is relatively large. The supporting plate 8 exerts gravity and friction resistance p to the contact point A of the 90° roller 1. The force exerted to push the supporting plate 8 by the 90° roller 1 is −p. The supporting plate 8 moves in direction p. When the 90° roller rotates reversely, the supporting 8 moves in an opposite direction.

Figure 10:
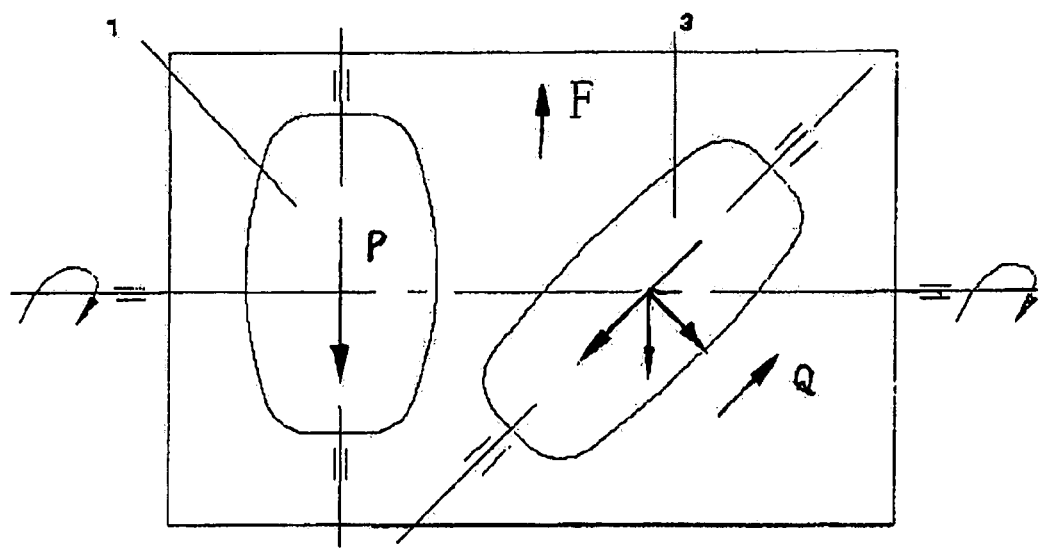
FIG. 10 shows schematic view of force applied to a group of roller wheels in accordance with the present invention.
Figure 11:
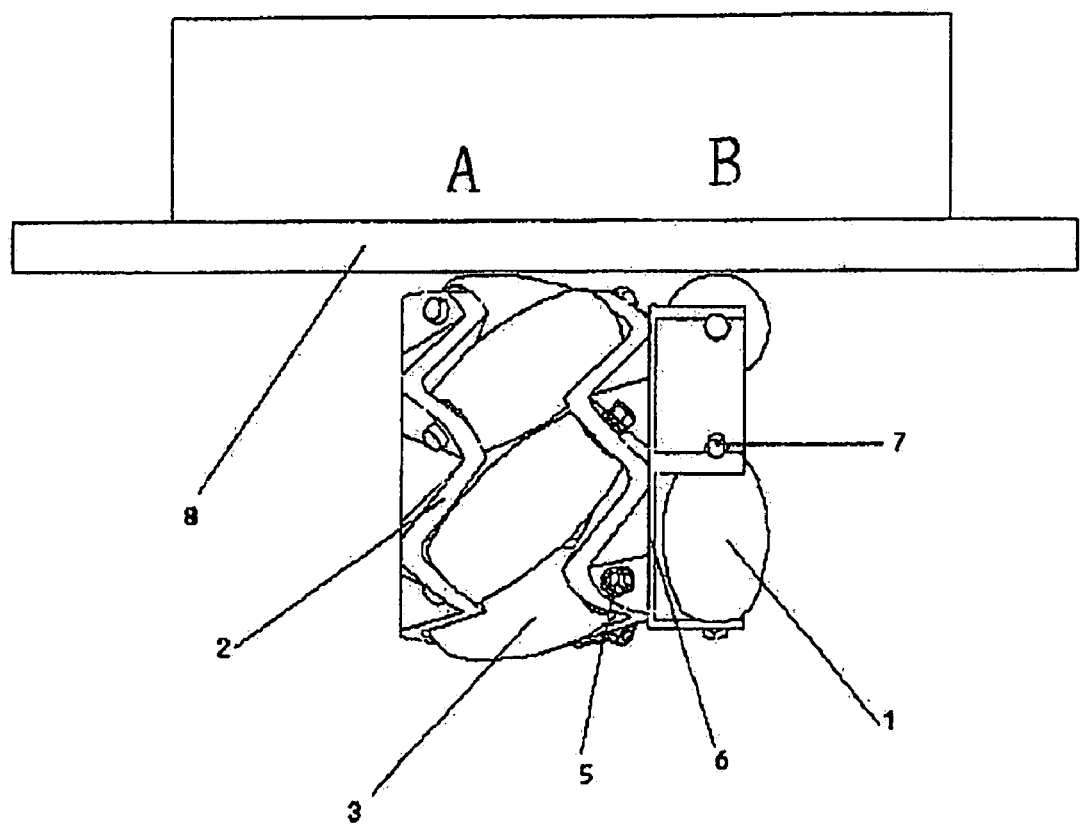
FIG. 11 shows schematic view of working state of the roller wheel in accordance with the present invention.

Referring to FIG. 10 and FIG. 11, taking example for the 45° rollers 3 on the left side of the 90° rollers 1, the 45° rollers 3 and the 90° rollers 1 contact with the supporting plate 8 by sequential turn and left-right turn. The contact point A moves along a curve track and contact point B moves along a linear track. The pressure intensity between the 45° roller 3, the 90° roller 1 and supporting plate 8 becomes at least fifty percent lower than single roller, while friction force also is reduced. The supporting plate 8 exerts gravity and friction resistances p and f to contact point A and contact point B of the 45° roller 3 and the 90° roller 1. The f can be divided into vectors f1 and f2. The force exerted to push the supporting plate 8 by 45° roller 3 is −f2, and the force exerted to the supporting plate 8 by 90° roller 1 is −p. For p is larger than f1, the supporting plate 8 moves in the direction of resultant force F of Q and p.

When the universal roller wheel rotates reversely, the supporting 8 moves in an opposite direction. This principle is also applicable to dextral 45° roller wheel, except a symmetrical direction of the sinistral universal roller wheel. Contents not detailed in this invention relate to open technology.

We claim:

1. A universal transmission roller wheel, comprising a 90° roller support (6) and a 45° roller support (2), a drive axle hole (4) being provided in the center of each roller support, wherein the 90° roller support and the 45° roller support are integrated in parallel, 90° rollers are mounted on first supporting shafts (7) fixed around on the 90° roller support with regular intervals, the axis of each 90° roller is at a spatial angle of 90° with the axis of the drive axle bore, 45° rollers (3) are mounted on second supporting shafts (5) fixed around on the 45° roller support with regular intervals, the axis of each 45° roller is at a spatial angle of 45° with the axis of the drive axle bore in the same inclining orientation.

2. The universal transmission roller wheel as described in claim 1, wherein the respective highest points on the outside surfaces of corresponding 90° roller (1) and 45° roller (3) are in a plane.

3. The universal transmission roller wheel as described in claim 1 or 2, wherein the 90° roller supports (6) are arranged on both sides of the 45° roller support (2), and the 45° roller support (2) and the two 90° roller supports (6) are integrated.

4. The universal transmission roller wheel as described in claim 3, wherein six 90° rollers (1) are mounted on each of the 90° roller supports (6) respectively, and six 45° rollers (3) are mounted on the 45° roller support (2).

5. The universal transmission roller wheel as described in claim 3, wherein four 90° rollers (1) are mounted on each of the 90° roller supports respectively, and six 45° rollers (3) are mounted on 45° roller support (2).

6. The universal transmission roller wheel as described in claim 1 or 2, wherein six 90° rollers (1) are mounted on the 90° roller support (6), and six 45° rollers (3) are mounted on the 45° roller support (2).

7. The universal transmission roller wheel as described in claim 1 or 2, wherein four 90° rollers (1) are mounted on the 90° roller support (6), and six 45° rollers (3) are mounted on the 45° roller support (2).

8. The universal transmission roller wheel as described in claim 1, wherein the outline diameter of the 90° roller support (6) is equal to the outline diameter of the 45° roller support (2).

9. The universal transmission roller wheel as described in claim 1, wherein the 90° roller support (6) where the 90° rollers are mounted is parallel with the 45° roller support (2) where the 45° rollers are mounted, the 90° roller support (6) is arranged on the left of the 45° roller support (2) and the 45° roller (3) is sinistral.

10. The universal transmission roller wheel as described in claim 1, wherein the 90° roller support (6) where the 90° rollers are mounted is parallel with the 45° roller support (2) where the 45° rollers are mounted, the 90° roller support (6) is arranged on the right of the 45° roller support (2) And the 45° roller (3) is dextral.

* * * * *